United States Patent
Ananthapadmanabh et al.

(10) Patent No.: US 9,298,426 B2
(45) Date of Patent: *Mar. 29, 2016

(54) COMPILER GENERATION OF THUNKING CODE

(71) Applicant: International Business Machines Corporation, Armonk, NY (US)

(72) Inventors: Madhu B. Ananthapadmanabh, Bangalore (IN); Sakthimurugan Arumugam, Bangalore (IN); Harshavardhana M. Puttamadaiah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,225

(22) Filed: Jun. 24, 2014

(65) Prior Publication Data
US 2015/0128108 A1    May 7, 2015

Related U.S. Application Data

(63) Continuation of application No. 14/074,134, filed on Nov. 7, 2013, now Pat. No. 9,110,672.

(51) Int. Cl.
*G06F 9/44* (2006.01)
*G06F 9/455* (2006.01)

(52) U.S. Cl.
CPC . *G06F 8/30* (2013.01); *G06F 9/455* (2013.01)

(58) Field of Classification Search
CPC .............. G06F 9/33; G06F 9/455; G06F 8/30
USPC ........................................................ 717/110
See application file for complete search history.

(56) References Cited

U.S. PATENT DOCUMENTS

| 5,490,256 A | 2/1996 | Mooney et al. |
| 6,941,547 B2 | 9/2005 | Duran |
| 6,983,456 B2 | 1/2006 | Poznanovic et al. |

(Continued)

FOREIGN PATENT DOCUMENTS

| EP | 0827072 A1 | 3/1997 |
| EP | 1284454 A2 | 8/2002 |

OTHER PUBLICATIONS

Ebner, et al., "Fast Native Function Calls for the Babel Language Interoperability Framework", provided by searcher on search report dated Aug. 2, 2013, pp. 329-338, U.S. Government work not protected by U.S. copyright, 11th IEEE/ACM International Conference on Grid Computing.

Smith, Duane A., "Adding 64-bit Pointer Support to a 32-bit Runtime Library", Digital Technical Journal, vol. 8, No. 2, 1996, p. 83-95.

(Continued)

*Primary Examiner* — John Chavis
(74) *Attorney, Agent, or Firm* — David M. Quinn; Alexa L. Ashworth

(57) ABSTRACT

A computer system receives a source code comprising an annotation, wherein the annotation is associated with a portion of the source code and wherein the annotation indicates a first bit-width. The computer system identifies a first data type of the portion of the source code. The computer system receives compatibility information corresponding to the first data type, the compatibility information indicating at least one compatible bit-width of the first data type. The computer system modifies the source code to insert a first code segment.

8 Claims, 3 Drawing Sheets

(56) References Cited

U.S. PATENT DOCUMENTS

| | | | |
|---|---|---|---|
| 7,013,460 | B2 | 3/2006 | Thompson et al. |
| 7,596,783 | B2 | 9/2009 | Huang et al. |
| 8,418,155 | B2 | 4/2013 | McAllister et al. |
| 2002/0138821 | A1 | 9/2002 | Furman et al. |
| 2007/0226681 | A1 | 9/2007 | Thorup |
| 2009/0106744 | A1 | 4/2009 | Li et al. |
| 2010/0125827 | A1 | 5/2010 | Francis et al. |
| 2013/0007701 | A1 | 1/2013 | Sundararam |
| 2013/0185697 | A1 | 7/2013 | Farchi et al. |

OTHER PUBLICATIONS

"The Modular Manual Browser", unixdev.net, provided by inventor in main idea of disclosure dated Dec. 3, 2012, <http://www.modman.unixdev.net/?sektion=2&page=shmget&manpath=HP-UX-11.11>.

"How to Call 32-bit Code from 16-bit Code Under Windows 95, Windows 98, or Windows Millennium Edition", provided by searcher in search report dated Aug. 2, 2013, <http://support.microsoft.com/kb/154093>.

"x86-64" From Wikipedia, the free encyclopedia, provided by inventor in post disclosure dated Jan. 10, 2013, Wikipedia® is a registered trademark of the Wikimedia Foundation, Inc., a non-profit organization, <http://en.wikipedia.org/wiki/X86-64>.

U.S. Appl. No. 14/074,134, entitled "Compiler Generation of Thunking Code", filed Nov. 7, 2013.

COMPILER GENERATION OF THUNKING CODE

FIELD OF THE INVENTION

The present invention relates generally to the field of software development tools, and more particularly to compiler generation of thunking code.

BACKGROUND OF THE INVENTION

Computer architectures may utilize integers, memory addresses, and other data units of a certain bit-width, such as 16-bit, 32-bit, or 64-bit. Modern operating systems may operate at one of these bit-widths, in which case the operating system may be referred to as, for example, a 32-bit or 64-bit operating system. A 64-bit operating system has a substantially larger memory addressing space than a 32-bit operating system.

Computer applications are developed by writing source code in one of a variety of computer programming languages, such as C or C++. The source code includes variables of particular data types. A data type may be incompatible with one or more operating system bit-widths (e.g., 16-bit, 32-bit, or 64-bit). For example, source code developed for a 32-bit operating system may utilize a data type (e.g., a pointer) which is incompatible with a 64-bit version of the same operating system, causing the source code to be incompatible with the 64-bit operating system.

Porting source code from one bit-width to another bit-width requires converting each data type incompatible with the bit-width of the destination operating system to a data type which is compatible in a process called "thunking." For example, a 32-bit pointer data type is incompatible with a 64-bit operating system due to memory addressing differences in 32- and 64-bit operating systems. Thus, a 32-bit pointer may be thunked to a 64-bit pointer for compatibility.

An annotation is a special form of syntactic metadata that can be added to the source code of software. Classes, methods, variables, parameters and packages may be annotated. Annotations can influence the run-time behavior of a resulting compiled application.

SUMMARY

Embodiments of the present invention disclose a method, computer program product, and system for thunking. A computer system receives a source code comprising an annotation, wherein the annotation is associated with a portion of the source code and wherein the annotation indicates a first bit-width. The computer system identifies a first data type of the portion of the source code. The computer system receives compatibility information corresponding to the first data type, the compatibility information indicating at least one compatible bit-width of the first data type. The computer system modifies the source code to insert a first code segment.

DETAILED DESCRIPTION

Figure 1:
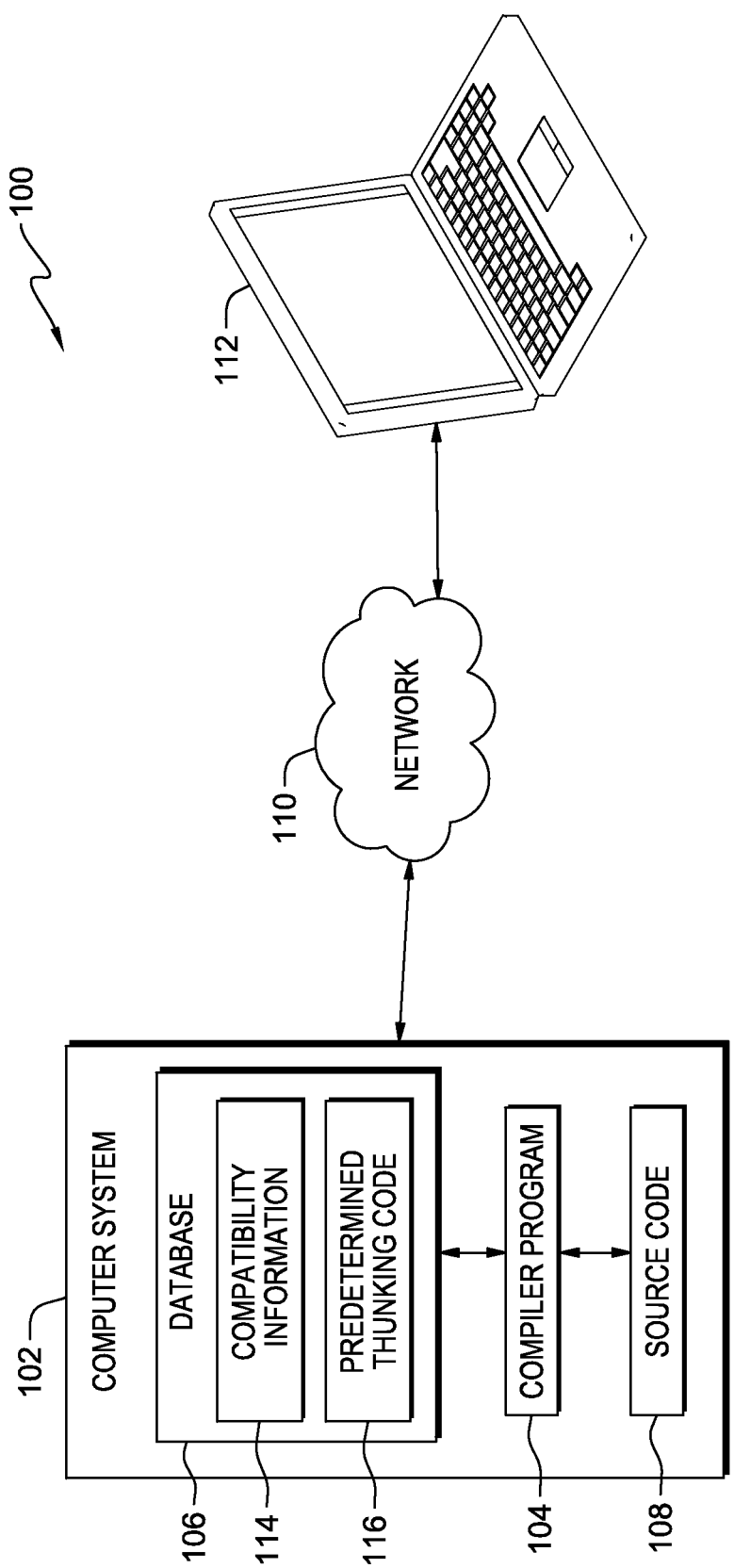
FIG. 1 is a functional block diagram illustrating a data processing environment, in accordance with an embodiment of the present invention.

Embodiments of the present invention provide a mechanism for thunking source code by pre-processor generation of kernel-level thunking computer instructions in response to annotated source code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. The term "computer-readable storage media" does not include computer-readable signal media.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java is a registered trademark of Oracle in the United States, other countries, or both), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 is a functional block diagram illustrating a data processing environment, generally designated 100, in accordance with one embodiment of the present invention. Data processing environment 100 includes computer system 102 and client device 112, both interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between computer system 102 and client device 112.

Computer system 102 and client device 112 may each respectively be a laptop computer, a tablet computer, a netbook computer, a personal computer (PC), a desktop computer, a personal digital assistant (PDA), a smart phone, or any programmable electronic device capable of communicating with client device 112 or computer system 102, respectively, via network 110. Computer system 102 includes compiler program 104, database 106, and source code 108. Database 106 includes compatibility information 114 and predetermined thunking code 116. Computer system 102 may include internal and external hardware components, as depicted and described in further detail with respect to FIG. 3.

Compiler program 104 operates to generate thunking code in response to an annotation of source code 108. In one embodiment, compiler program 104 resides on computer system 102. In other embodiments, compiler program 104 may reside on another computer system or another computing device, provided that compiler program 104 is capable of accessing database 106 and source code 108. Compiler program 104 is discussed in more detail in connection with FIG. 2.

Thunking is an operation to make lower bit-width code (e.g., 32-bit) compatible with a higher bit-width environment (e.g., a 64-bit operating system). For example, a 32-bit pointer can be thunked in order to make it compatible with a 64-bit operating system, such as by converting the 32-bit pointer to a 64-bit pointer. Conversely, 64-bit code can be reverse thunked for compatibility with 32-bit code. For example, a 64-bit pointer can be reverse thunked to convert it to a 32-bit pointer.

Source code 108 comprises computer instructions in a human-readable computer language (e.g., C, C++). In one embodiment, source code 108 resides on computer system 102. In other embodiments, source code 108 may reside on another computer system or another computing device, provided that source code 108 is accessible by compiler program 104. In another embodiment, a developer writes source code 108 and causes source code 108 to be made available to compiler program 104.

Source code 108 may further comprise an annotation. In one embodiment, source code 108 includes one or more thunking annotations, each associated with a portion of source code 108. The portion of source code 108 may comprise one or more function calls, arguments and/or variables. Each argument and/or variable has a data type. As one example, a line of source code 108 may comprise the annotation "@THUNKING32to64" which indicates a thunking operation from a source bit-width of 32-bit to a destination bit-width of 64-bit.

Database 106 is a repository that may be written and read by compiler program 104. Compatibility information 114 and predetermined thunking code 116 may be stored to database 106. In one embodiment, the compatibility information 116 identifies a data type and at least one bit-width with which the first data type is compatible. In one embodiment, the predetermined thunking code 116 comprises computer instructions to call a kernel-level thunking operation. In some embodiments, database 106 may be written and read by outside programs and entities to populate database 106 with compatibility information 114 and predetermined thunking code 116. In one embodiment, database 106 resides on computer system 102. In other embodiments, database 106 may reside on another computer system, another computing device, or client device 112, provided that database 106 is accessible to compiler program 104. In one embodiment, database 106 resides in compiler program 104, for example as part of a thunking plug-in.

Figure 2:
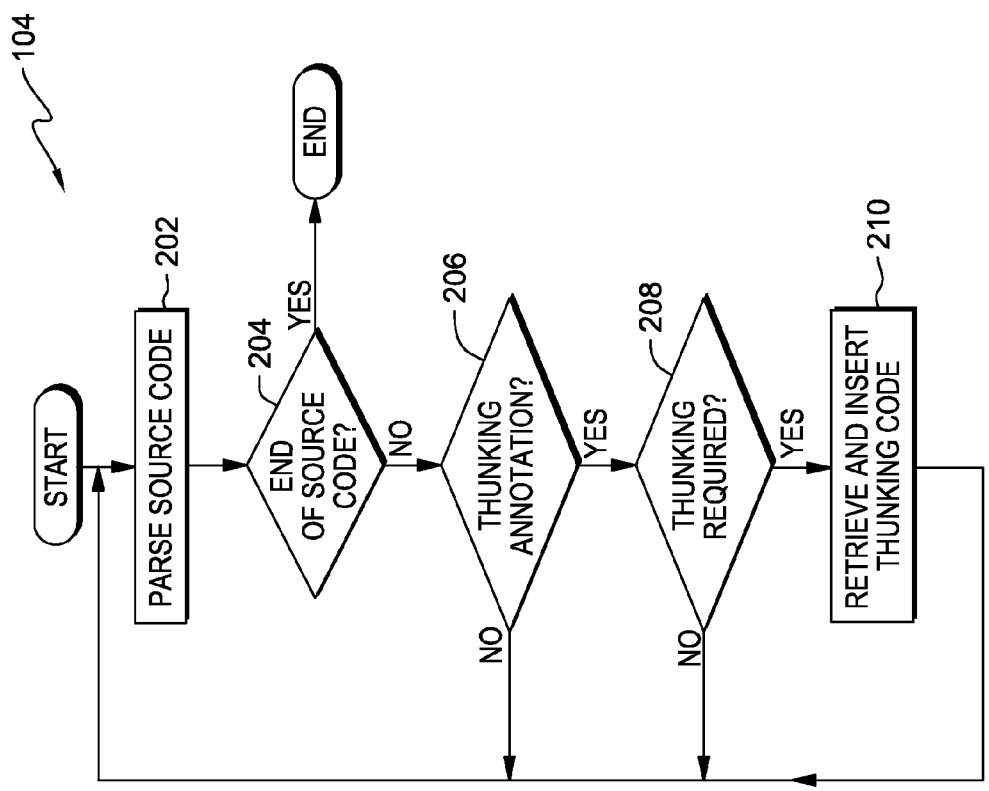
FIG. 2 is a flowchart depicting operational steps of a compiler program, on a computer system within the data processing environment of FIG. 1, for compiler generation of thunking code, in accordance with an embodiment of the present invention.

FIG. 2 is a flowchart depicting operational steps of compiler program 104 for generation of thunking code in response to a source code annotation, in accordance with an embodiment of the present invention.

In step 202, compiler program 104 parses source code 108. In one embodiment, compiler program 104 parses each line of source code 108. In one embodiment, compiler program 104 determines whether each line of source code 108 comprises an annotation. Compiler program 104 is capable of parsing at least one programming language, including the programming language in which source code 108 is written.

In decision 204, compiler program 104 determines whether it has reached the end of the source code. For example, compiler program 104 may determine whether the line of source code 108 currently being parsed comprises an end-of-file character. If so (decision 204, YES branch), then compiler program 104 is complete. If not (decision 204, NO branch), then compiler program 104 proceeds to decision 206.

In decision 206, compiler program 104 determines whether the line of source code 108 currently being parsed comprises a thunking annotation. If compiler program 104 determines that the line of source code 108 does not comprise a thunking annotation (decision 206, NO branch), then compiler program 104 returns to step 202 to continue to parse source code 108, after processing the line of source code 108, e.g., by compiling the line of code.. If compiler program 104 determines that the line of source code 108 does comprises a thunking annotation (decision 206, YES branch), then compiler program 104 continues to decision 208.

In decision 208, compiler program 104 identifies at least one data type included in the portion of source code 108 associated with the thunking annotation and, for each, determines whether thunking is required. In one embodiment, the associated portion of source code 108 comprises a function call, in which case compiler program 104 identifies the data type of each argument and/or variable of the function call to determine if any of the arguments are of a data type which requires thunking. A data type requires thunking if it is incompatible with the destination bit-width indicated by the thunking annotation. For example, the destination bit-width of annotation "@THUNKING32to64" is 64-bit, with which a 32-bit pointer (e.g., data type INT_PTR in C++) is incompatible.

In one embodiment, compiler program 104 compares each data type of the portion of source code 108 to compatibility information 114 of database 106 to determine whether the data type is compatible with the destination bit-width. If the data types are compatible with the destination bit-width, then no thunking is actually required (decision 208, NO branch), in which case compiler program 104 returns to step 202 to continue to parse source code 108. If the data types are not compatible with the destination bit-width, then thunking is required (decision 208, YES branch), in which case compiler program 104 proceeds to step 210.

In step 210, compiler program 104 retrieves and inserts thunking code for the portion of source code 108 associated with the thunking annotation. In one embodiment, compiler program 104 retrieves a first thunking code segment from database 106 and inserts the first thunking code segment in source code 108 prior to the portion of source code 108 associated with the thunking annotation. In another embodiment, compiler program 104 retrieves a second thunking code segment from database 106 and inserts the second thunking code segment after the portion of source code 108 associated with the thunking annotation. In yet another embodiment, compiler program 104 retrieves a third thunking code segment from database 106 and inserts the third thunking code segment within the portion of source code 108 associated with the thunking annotation. In one embodiment, the second thunking code segment completes the thunking operation. In another embodiment, the second code segment completes the thunking operation and/or performs reverse thunking. For example, the first thunking code segment may invoke a kernel-level thunking routine or function to thunk the portion of source code 108 associated with the thunking annotation, which then executes, followed by the second code segment, which reverse thunks back to the lower bit-width so source code 108 can resume execution at the lower bit-width. In one embodiment, compiler program 104 inserts the thunking code during the pre-processor stage of compilation.

Figure 3:
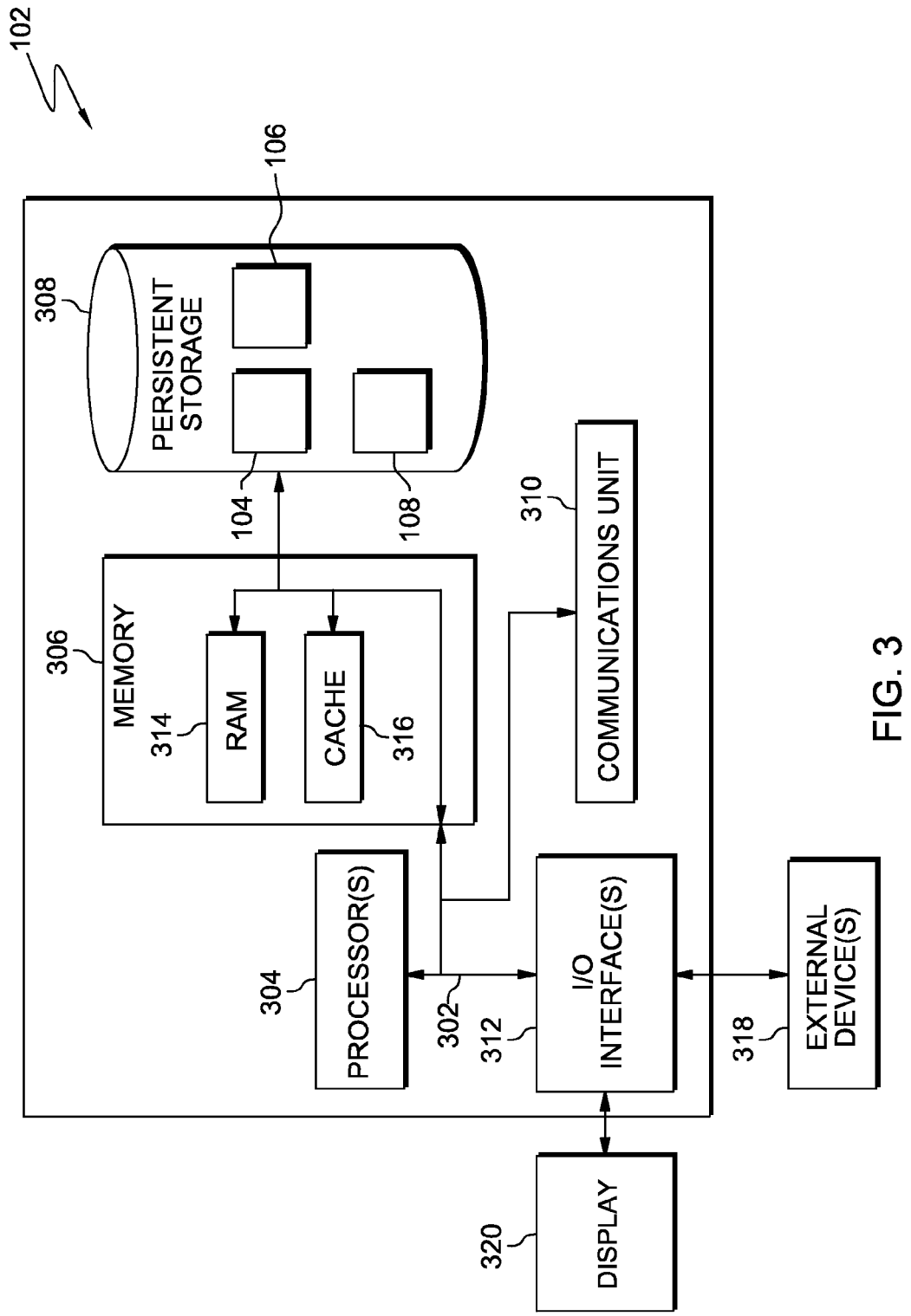
FIG. 3 depicts a block diagram of components of the computer system executing the compiler program, in accordance with an embodiment of the present invention.

FIG. 3 depicts a block diagram of components of computer system 102 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer system 102 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Compiler program 104, database 106, and source code 108 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including and client device 112. In these examples, communications unit 310 includes one or more network interface cards. Communications unit 310 may provide communications through the use of either or both physical and wireless communications links. Compiler program 104, database 106, and source code 108 may be downloaded to persistent storage 308 through communications unit 310.

I/O interface(s) 312 allows for input and output of data with other devices that may be connected to computer system 102. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., compiler program 104, database 106, and source code 108, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for thunking, the method comprising:

receiving, at a computer system, a source code comprising an annotation, wherein the annotation is associated with a portion of the source code and wherein the annotation indicates a first bit-width;

identifying a first data type of the portion of the source code;

receiving a compatibility information corresponding to the first data type, the compatibility information indicating at least one compatible bit-width of the first data type; and modifying the source code to insert a first code segment.

2. The method of claim 1, further comprising:

comparing the at least one compatible bit-width of the first data type to the first bit-width to determine whether the first data type is compatible with the first bit-width.

3. The method of claim 2, wherein modifying the source code comprises:

modifying the source code to insert the first code segment in response to determining that the first data type is not compatible with the first bit-width.

4. The method of claim 1, wherein modifying the source code comprises:

modifying the source code to insert the first code segment prior to the portion of the source code associated with the annotation.

5. The method of claim 1, wherein modifying the source code comprises modifying the source code by a compiler during preprocessing of the source code.

6. The method of claim 1, wherein the first code segment corresponds to a thunking operation corresponding to the first bit-width and a second bit-width.

7. The method of claim 4, further comprising:

modifying the source code to insert a second code segment after the portion of the source code associated with the annotation.

8. The method of claim 1, wherein the first code segment corresponds to a kernel-level thunking operation.

* * * * *